Feb. 19, 1935. P. F. DEFORD 1,991,547
ANT POISON FEEDER
Filed Oct. 21, 1933
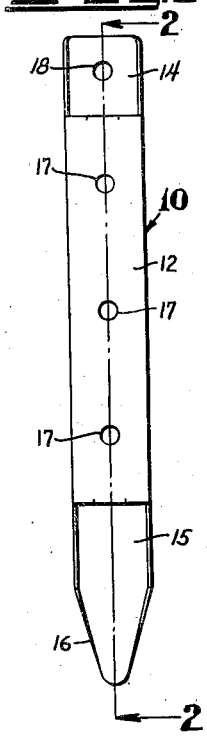
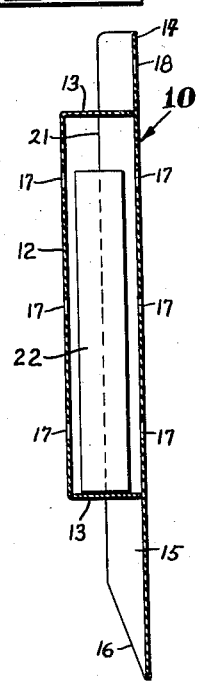
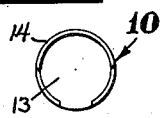
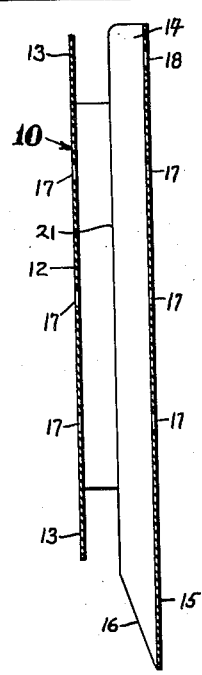
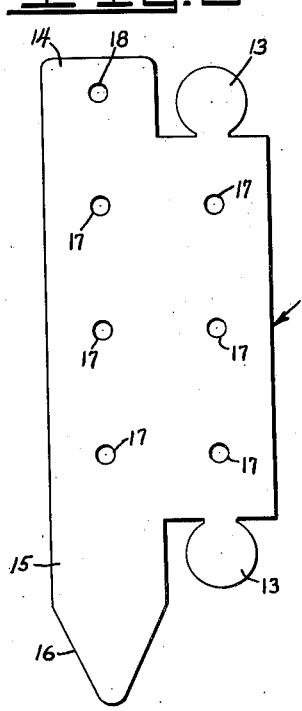
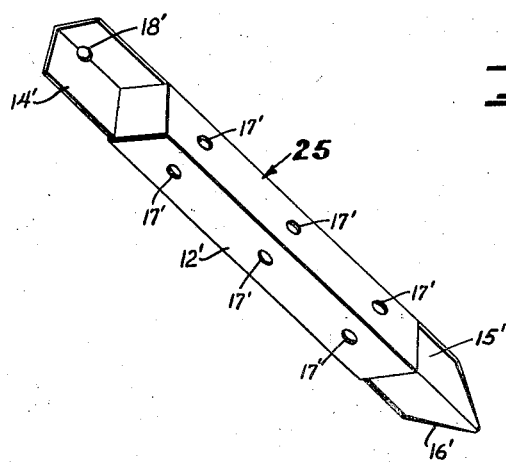
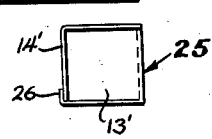
INVENTOR.
PAUL F. DEFORD
BY
ATTORNEY.

Patented Feb. 19, 1935

1,991,547

UNITED STATES PATENT OFFICE 1,991,547

ANT POISON FEEDER

Paul F. Deford, Pasadena, Calif.

Application October 21, 1933, Serial No. 694,609

3 Claims. (Cl. 43—131)

This invention relates to improvements in ant poison feeders.

The general object of the invention is to provide an improved container for ant poison which while allowing free access to the poison for ants prevents children, cats, dogs, etc. from having access to the poison.

Other objects and the advantages of this invention will be apparent from the following description taken in connection with the accompanying drawing wherein:

Fig. 1 is a side elevation of my improved container;

Fig. 2 is a section taken on line 2—2 of Fig. 1;

Fig. 3 is a top plan view of the container;

Fig. 4 is a view similar to Fig. 2 showing the device before the ends thereof are closed;

Fig. 5 is a face view of a blank from which the device is made;

Fig. 6 is a perspective view of a modified form of container; and,

Fig. 7 is a top plan view of the container shown in Fig. 6.

Referring to the drawing by reference characters I have indicated my improved container generally at 10. As shown the container 10 includes a cylindrical body portion 12 closed at each end by cap members 13. Extending above the upper end of the body 12 I provide a lip 14 and extending below the lower end of the body I provide a lip 15 the lower portion of which is tapered and sharpened as at 16 so that it may be driven into a tree or other object. As shown the lips 14 and 15 are semi-cylindrical in cross section to conform to the cylindrical shape of the body 12. The body 12 has a plurality of apertures 17 therein and an aperture 18 is provided in the lip 14.

As shown in Fig. 5 the container 10 is made from a sheet of metal which is stamped to form a blank 20 having all portions of the device integral. After the blank 20 is formed it is rolled to a cylindrical shape with the opposite side edges abutting, as shown in Fig. 4 at 21. Thereafter, the device is dipped in a suitable coloring such as lacquer and allowed to dry. Then the bottom cap portion 13 is bent at right angles to the body to close the lower end thereof and then a charge of poisoned material such as indicated at 22 is positioned in the body 12. Thereafter, the top cap portion 13 is bent at right angles to the body to close the upper end of the body thus entirely enclosing the poisoned material 22.

In use the device 10 may be suspended from a suitable support in the aperture 18 or the tapered end 16 may be forced into the ground to support the container.

Ants being attracted by the scent of the poisoned material 22 will enter the body 12 through the apertures 17 and after eating from the poisoned material 22 will leave through the apertures 17.

The device is made of sufficiently thick metal to make it impossible for children or animals to extract the poison stick 22 and as the apertures 17 are small, animals such as dogs and cats cannot reach the poison stick 22.

In Figs. 6 and 7 I have indicated a slightly modified form of my invention generally at 25. As shown the device 25 is similar to the device 10 except that it is square in cross section instead of circular so therefore I have indicated the portions of the device 25 which are similar to like portions of the device 10 by similarly primed reference numerals.

Instead of forming a butt joint as indicated at 21 in Fig. 4 in the device 25 I have shown a lap joint at 26 which if desired may be spot welded.

Any suitable type of poison material 22 may be used in the device.

From the foregoing description it will be apparent that I have provided a novel ant poison container and ant feeder which is simple in construction, handy and safe.

Having thus described my invention, I claim:

1. A one piece metal poison container made from a flat blank bent to form an elongated body portion, a part of each end of said body being constructed to form a closure for the body portion, there being a plurality of apertures in said body opening into said chamber, and a lip member integral with the body and adjacent to one of said closures and extending from one end of said body and including a tapered end portion.

2. A poison container including a hollow cylindrical body portion, end members closing the ends of said body, said end members being integral with said body portion, a lip portion extending beyond one end of said body, said lip having an aperture therein and a second lip portion, said second lip portion extending beyond the opposite end of said body, the outer end portion of said second lip being tapered, said first and second lip being integral with said body, there being a plurality of spaced apertures in said body.

3. A poison container including a hollow cylindrical body portion, end members closing the ends of said body, said end members being integral with said body portion, a lip portion extending beyond one end of said body, said lip having an aperture therein and a second lip portion, said second lip portion extending beyond the opposite end of said body, the outer end portion of said second lip being tapered, said first and second lips being integral with said body and being arcuate, there being a plurality of spaced apertures in said body.

PAUL F. DEFORD.